April 9, 1929.   C. H. OVERMYER   1,708,735
GLASS KNOB SECURING DEVICE
Filed April 6, 1928

C. H. Overmyer, Inventor

Patented Apr. 9, 1929.

1,708,735

UNITED STATES PATENT OFFICE.

CLYDE H. OVERMYER, OF HASTFORD CITY, INDIANA.

GLASS-KNOB-SECURING DEVICE.

Application filed April 6, 1928. Serial No. 267,929.

This invention has reference to furniture hardware, and more particularly to knobs constructed of perishable material such as glass or the like, the primary object of the invention being to provide novel means whereby glass knobs may be readily and easily secured to their supporting surfaces in such a way that the knobs will be strong and durable and not liable to break while in use.

Another object of the invention is the provision of a securing device embodying a securing sleeve having threads to removably receive the threaded neck of a knob, novel means being provided for securing the sleeve to the structure to which the knob is attached.

A still further object of the invention is to provide an invisible fastener or attaching device for glass knobs, so that various designs may be placed in the outer surface of the knobs in such a way that the fastening device will not mar the beauty of the design.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
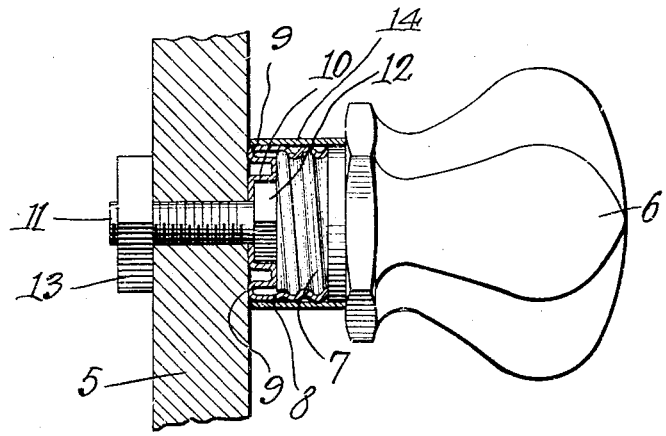
Figure 1 is an elevational view of a knob, the securing device being shown in section.
Figure 2:
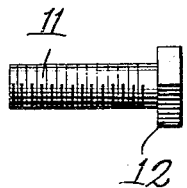
Figure 2 is an elevational view of a square headed bolt forming a part of the securing device.
Figure 3:
Figure 3 is a plan view thereof.
Figure 4:
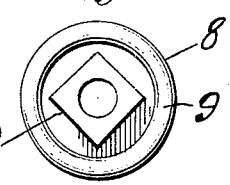
Figure 4 is an end elevational view of the securing sleeve.
Figure 5:
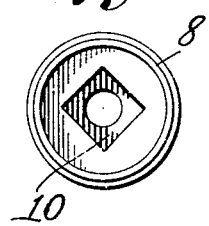
Figure 5 is an elevational view of the opposite end of the securing sleeve.

Referring to the drawing in detail, the reference character 5 indicates the supporting member to which the knob is attached, and which may be in the form of a drawer, hinged closure or any suitable structure to which the knob is to be attached.

As shown, the knob which is indicated by the reference character 6, and which is formed preferably of glass material, is provided with a threaded neck 7 designed to be fitted into the threaded sleeve 8 forming a part of the securing device.

This sleeve 8 is formed preferably of sheet metal so that it may be stamped by a single operation of a stamping machine, and in the construction of the sleeve an annular rib 9 is formed as well as a square recess 10, the length of the rib 9 being equal to the depth of the recess 10 so that the outer edge of the rib 9 will lie in a plane with the outer edge of the bottom of the recess insuring a close fit between the securing sleeve and member 5.

An opening is formed in the supporting member 5 to receive the bolt 11 forming a part of the securing device, the bolt 11 being formed with a square head 12 fitted in the square recess of the sleeve 7 to the end that rotary movement of the bolt 11 will be prevented when the nut, which is indicated by the reference character 13, is positioned to draw the sleeve into close engagement with the supporting surface to which the knob is secured. A finishing sleeve 14 is positioned over the sleeve of the attaching device to hide the same.

Figure 6:
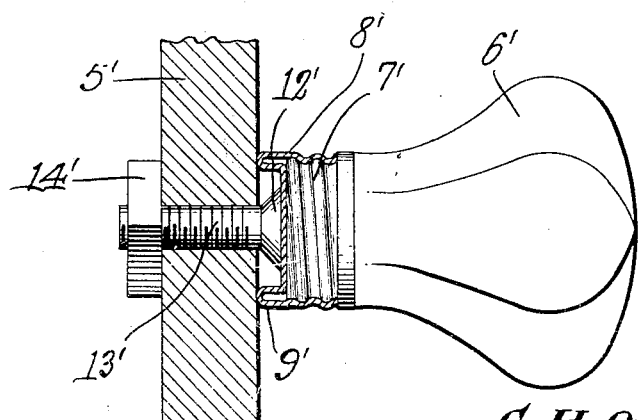
Figure 6 is an elevational view illustrating a modified form of the invention.

In the form of the invention as shown by Figure 6, the knob is indicated by the reference character 6' and is formed with a threaded neck 7' fitted in the threaded sleeve 8' which is also formed with an annular rib 9'.

In the formation of the rib 9' a recessed surface is provided within which the head 12' of the bolt 13' is welded, the bolt being threaded and passed through an opening in the supporting structure 5', where it is supplied with a nut 14'.

While I have shown and described the attaching device especially designed for attaching glass knobs to supporting surfaces such as drawers or doors of furniture, it is to be understood that the device may be employed as a means for securing glides to furniture legs, the glides supplementing the usual casters.

From the foregoing it will be obvious that due to the construction shown and described, glass knobs may be readily and easily secured to a supporting structure in such a way that damage or breakage of the knob will be prevented while the knob is in use.

I claim:

1. In combination with a knob having a threaded neck, a securing device embodying a threaded sleeve to receive the threaded neck and a bolt carried by the sleeve for securing the sleeve and knob connected therewith, to a supporting structure.

2. In combination with a knob having an extension, a securing device embodying a sleeve to receive the extension of the knob, said sleeve having a square recess, a bolt having a square head to be fitted in the recess to prevent rotary movement of the bolt with respect to the sleeve, and a nut on the bolt for securing the sleeve and knob supported thereby to a supporting member.

In testimony that I claim the foregoing as my own, I have hereto affixed my signature.

CLYDE H. OVERMYER.